United States Patent [19]

Sonda

[11] 4,280,174
[45] Jul. 21, 1981

[54] DC-DC CONVERTER

[75] Inventor: Eijiro Sonda, Tokyo, Japan

[73] Assignee: TDK Electronics Co., Ltd., Tokyo, Japan

[21] Appl. No.: 112,752

[22] Filed: Jan. 17, 1980

[30] Foreign Application Priority Data

Feb. 1, 1979 [JP] Japan .................................. 54-10802
Feb. 1, 1979 [JP] Japan ............................ 54-12123[U]
Feb. 1, 1979 [JP] Japan ............................ 54-12124[U]

[51] Int. Cl.³ ......................................... H02M 3/335
[52] U.S. Cl. ..................................................... 363/24
[58] Field of Search .................................. 363/17–25, 363/27, 55–58, 131–134, 135

[56] References Cited

U.S. PATENT DOCUMENTS

| 3,079,525 | 2/1963 | Tap ........................................ 363/18 |
| 3,652,919 | 3/1972 | Harrigan ............................. 363/22 X |
| 4,004,187 | 1/1977 | Walker ................................ 363/23 X |
| 4,044,294 | 8/1977 | Grundy .................................. 363/25 |

Primary Examiner—William M. Shoop
Attorney, Agent, or Firm—Allison C. Collard; Thomas M. Galgano

[57] ABSTRACT

A DC-DC converter for converting a primary DC voltage to a secondary DC voltage comprises a transformer with a primary winding and a secondary winding each wound on a ferromagnetic core, a primary DC voltage power source, a plurality of switching transistors connected between said DC voltage power source and the primary winding of the transformer, means for controlling the status (ON or OFF) of the transistors so that an alternate current or an intermittent current in the predetermined direction flows from the DC power source to the primary winding of the transformer, a rectify/smoothing circuit connected between the secondary winding of the transformer and a load, and said primary winding of the transformer having a center tap which is connected to one end of the DC voltage power source through a capacitor.

6 Claims, 8 Drawing Figures

DC-DC CONVERTER

BACKGROUND OF THE INVENTION

The present invention relates to the improvement of a DC-DC converter which converts the primary direct current (DC) voltage to the secondary DC voltage through the switching of the primary DC voltage by switching transistors, the voltage conversion by a transformer, and the rectification of the secondary voltage of the transformer.

FIG. 1A shows a prior DC-DC converter having a single transistor, and FIG. 1B shows the operational waveform in that DC-DC converter. In FIG. 1A, the reference numeral 1 is a transformer for converting an alternate voltage, 2 is a DC power source or a battery, 3 is a rectifier/smoother circuit, having the pair of diodes $D_1$ and $D_2$, the inductance L and the capacitance $D_1$. Also, 4 is a load, and Tr is a transistor for the switching of the current in the primary winding of the transformer. The primary winding $1_1$ of the transformer 1 is connected to the power source 2 through the collector-emitter path of the transistor Tr. The output voltage of the DC power source 2 is supposed to be V volts. The secondary winding $1_2$ of the transformer 1 is connected to the load through the rectifier/smoother circuit 3. The transistor TR repeats the ON status and the OFF status according to the pulse signal applied to the base electrode (B) of the transistor Tr, and then, the transformer 1 is excited substantially by the alternate current (AC) voltage. During the time $t_1$ when the transistor Tr is in ON status, the load current flows through the diode $D_1$ in the rectifier/smoother circuit 3, and during the time $t_2$ when the transistor Tr is in OFF status, the load current flows through the diode $D_2$ in the rectifier/smoother circuit 3. Thus, the continuous direct current is supplied to the load 4.

In FIG. 1A, the voltage $V_{ce}$ between the collector and the emitter of the transistor Tr is almost zero when the transistor Tr is ON, and said voltage $V_{ce}$ is $V+V_R$, which is the sum of the voltage (V) of the power source 2 and the flyback voltage $V_R$ induced in the primary winding of the transformer 1 when the transistor Tr is OFF. Therefore, the waveform of the voltage $V_{ce}$ is shown in FIG. 1B, and it should be noted that the maximum value of the voltage $V_{ce}$ is $V+V_R$. Therefore, the withstand voltage between the collector and the emitter of the transistor Tr must be considerably high and must be higher than $V+V_R$. And said withstand voltage must be extremely high when the input voltage V is obtained by rectifying the commercial alternate current power source.

However, a transistor with a high withstand voltage has generally the disadvantage that the switching speed is rather slow. The recent DC-DC converter operates in high speed for providing a small size of an apparatus and the high efficiency, that slow switching speed of a transistor with a high withstand voltage is a serious disadvantage.

Another prior DC-DC converter is a full-bridge type DC-DC converter which has a transformer and two pairs of switching transistors connected to the transformer. Each pair of switching transistors are alternately turned ON and OFF, then, the bipolar current is provided in the primary winding of the transformer from the DC power source, and the secondary voltage induced on the secondary winding of the transformer is rectified by the rectifier/smoother circuit and is applied to the load. Accordingly, the both terminals of the primary winding of the transformer are subject to be disconnected at the same time from the primary power source by the switching transistors, and it is the disadvantage that the potential of the primary winding is floating and is unstable when the primary winding is disconnected from the power source. That is to say, although the switching transistors disconnects the transformer from the primary power source, the transformer is still connected to the primary power source through a shield member surrounding the transformer, or the capacitance between the transformer and the ground. If the variance of the stray or the change of the stray capacitance et al changes, the potential of the transformer changes. If the change of the potential of the transformer is large, the flyback voltage generated when the switching transistors are in OFF status is superposed on the power source line through the diodes which are connected parallel to the switching transistors for protecting the same from the high flyback voltage. Further, the switching transistors are subject to be supplied the voltage higher than the allowable withstand voltage of the transistors, due to said change of the potential of the transformer.

SUMMARY OF THE INVENTION

It is an object, therefore, of the present invention to overcome the disadvantages and limitations of a prior DC-DC converter by providing a new and improved DC-DC converter.

It is also an object of the present invention to provide a DC-DC converter which can use a transistor with a low withstand voltage.

The above and other objects are attained by a DC-DC converter for converting a primary DC voltage to a secondary DC voltage comprising a transformer with a primary winding and a secondary winding each wound on a ferromagnetic core, a primary DC voltage power source, a plurality of switching transistors connected between said DC voltage power source and the primary winding of the transformer, means for controlling the status (OFF or ON) of the transistors so that an alternate current or an intermittent current in the predetermined direction flows from the DC power source to the primary winding of the transformer, a rectifier/smoother circuit connected between the secondary winding and a load, and said primary winding of the transformer having a center tap which is connected to one end of the DC voltage power source through a capacitor.

BRIEF DESCRIPTION OF THE DRAWINGS

The foregoing and other objects, features, and attendant advantages of the present invention will be highly understood as the same become better understood by means of the following description and accompanying drawings wherein.

DESCRIPTION OF THE PREFERRED EMBODIMENTS

Figure 2A:
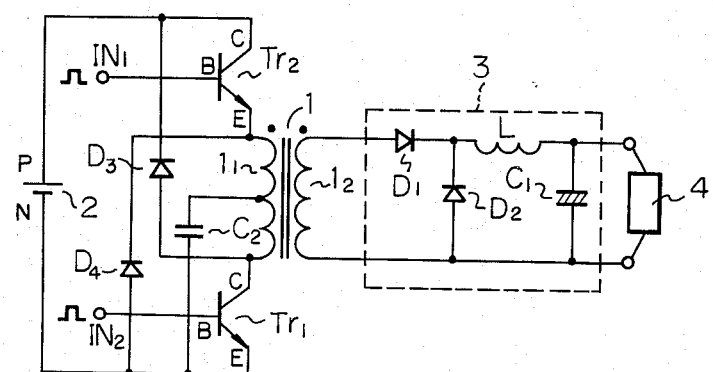
FIG. 2A is the circuit diagram of the present DC-DC converter.
Figure 2B:
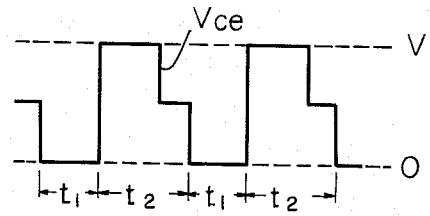
FIG. 2B shows the operational waveform of the DC-DC converter shown in FIG. 2.

FIG. 2A is the circuit diagram of the first embodiment of the DC-DC converter according to the present invention, and FIG. 2B shows the operational waveform of the apparatus shown in FIG. 2A.

Figure 1A:
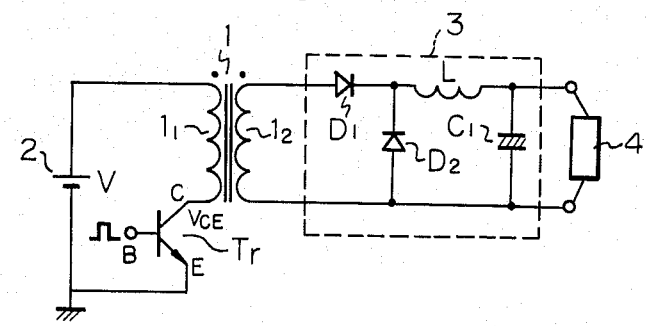
FIG. 1A is the circuit diagram of a prior DC-DC converter.
Figure 1B:
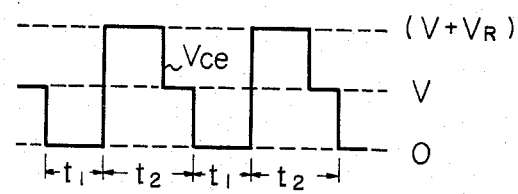
FIG. 1B shows the operational waveform of a prior DC-DC converter.

In FIG. 2A, the same reference numerals as those in FIG. 1A show the same members as those in FIG. 1A. In FIG. 2A, $Tr_1$ is the first switching transistor and $Tr_2$ is the second switching transistor. The transformer 1 has the primary winding $1_1$ and the secondary winding $1_2$ each wound on a ferromagnetic core (not shown). One end of the primary winding $1_1$ is connected to the negative terminal N of the power source 2 through the collector-emitter path of the first transistor $Tr_1$, and said end of the primary winding $1_1$ is connected to the positive terminal P of the power source 2 through the diode $D_3$. The other end of the primary winding $1_1$ is connected to the positive terminal P of the power source 2 through the collector-emitter path of the second transistor $Tr_2$, and said end of the primary winding $1_1$ is also connected to the negative terminal N of the power source 2 through the diode $D_4$. The secondary winding $1_2$ of the transformer 1 is connected to the load 4 through the rectifier/smoother circuit 3. Also, the capacitance $C_2$ is provided between the center point or the center tap of the primary winding $1_1$ of the transformer 1 and the negative terminal N of the DC power source 2 for improving the potential stability of the primary winding $1_1$.

The switching transistors $Tr_1$ and $Tr_2$ are controlled so that they turn to ON or OFF at the same time by the input signal applied to the base electrodes B of those transistors. When those transistors are turned ON, the electric current flows from the positive terminal P of the power source 2 through the second transistor $Tr_2$, the primary winding $1_1$, and the first transistor $Tr_1$ to the negative terminal N of the power source 2, and when those transistors are turned OFF, that current is interrupted. Therefore, when those transistors $Tr_1$ and $Tr_2$ repeat the ON status and the OFF status, an alternate voltage is substantially supplied to the primary winding of the transformer 1, and the secondary voltage is induced on the secondary winding $1_2$. In this case, in the duration $t_1$ that the transistors $Tr_1$ and $Tr_2$ are in ON status, the current flows through the diode $D_1$ in the rectifier/smoother circuit 3, and in the duration $t_2$ that the transistors $Tr_1$ and $Tr_2$ are in OFF status, the current flows through the diode $D_2$ in the rectifier/smoother circuit 3. Thus, the continuous DC current flows in the load 4.

When the transistors $Tr_1$ and $Tr_2$ turn OFF, a flyback voltage is induced in the primary winding $1_1$ of the transformer 1. However, the energy of that flyback voltage is returned to the power source 2 through the diodes $D_3$ and $D_4$. Therefore, the voltage $V_{ce}$ between the collector and the emitter of the transistor $Tr_1$ and $Tr_2$ is less than V volts which is equal to the voltage of the power source 2, as shown in FIG. 2B.

Further, although both the transistors $Tr_1$ and $Tr_2$ become to OFF status at the same time, the potential of the primary winding is substantially fixed to the potential of the capacitor $C_2$. Therefore, no high voltage is induced in the primary winding $1_1$.

Figure 3A:
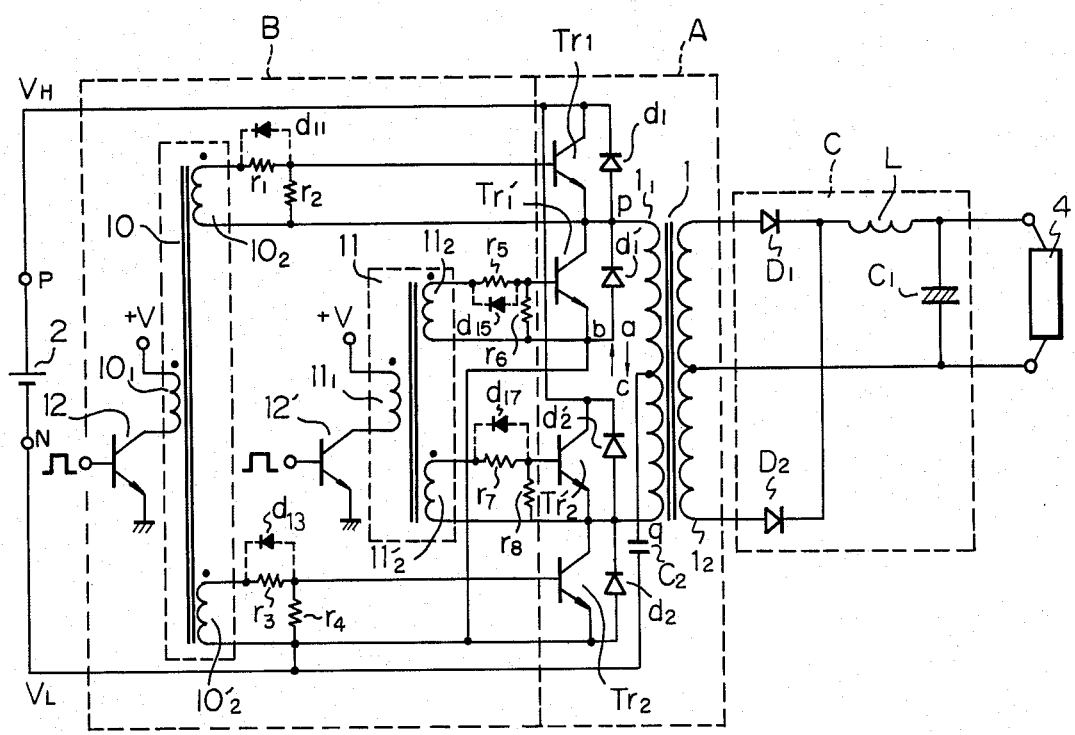
FIG. 3A is the circuit diagram of another embodiment of the present DC-DC converter.

FIG. 3A shows another embodiment of the DC-DC converter according to the present invention, and FIG. 3A is a full bridge type DC-DC converter. In FIG. 3A, the portion A is the main portion of the DC-DC converter having the transformer 1 and the switching transistors $Tr_1$, $Tr_1'$, $Tr_2$ and $Tr_2'$. The portion B is the drive portion which provides the input signal to the base electrodes of the switching transistors in the portion A, and the portion C is the rectifier/smoother circuit. The load 4 is connected to the output of the rectifier/smoother circuit C, and the power supply 2 supplies the power to the portion A and the portion B.

The transformer 1 has the primary winding $1_1$ and the secondary winding $1_2$. One end (p) of the primary winding $1_1$ is connected to the junction point of the emitter of the first transistor $Tr_1$ and the collector of the second transistor $Tr_1'$. The other end (q) of the primary winding $1_1$ is connected to the junction point of the emitter of the third transistor $Tr_2'$ and the collector of the fourth transistor $Tr_2$. The diodes $d_1$, $d_2$, $d_3$ and $d_4$ for preventing the flyback voltage are connected between the collector and the emitter of the transistors $Tr_1$, $Tr_2'$, $Tr_2'$ and $Tr_2$, respectively, so that the anode of each diode is connected to the collector of each transistor, and the cathode of each diode is connected to the emitter of each transistor. The collectors of the transistors $Tr_1$ and $Tr_2'$ are connected to the positive electrode P of the power source 2, and the emitters of the transistors $Tr_1'$ and $Tr_2$ are connected to the negative electrode N of the power source 2. The center point (c) of the primary winding of the transformer 1 is connected to the negative electrode N of the power supply 2 through the capacitor $C_2$.

The drive portion B has the transformer 10 and 11, the former transformer 10 has the primary winding $10_1$ and a pair of the secondary windings $10_2$ and $10_2'$, and the latter transformer 11 has the primary winding $11_1$ and a pair of the secondary windings $11_2$ and $11_2'$. The secondary windings $10_2$ and $10_2'$ are connected between the base and the emitter of the transistors $Tr_1$ and $Tr_2$, respectively, so that the bases of those transistors receive the input signal of the same polarity with each other. Also, the secondary windings $11_2$ and $11_2'$ are connected between the base and the emitter of the transistors $Tr_1'$ and $Tr_2'$, respectively, so that the bases of those transistors receive the input signal of the same polarity with each other.

The resistors $r_1$, $r_2$, $r_3$, $r_4$, $r_5$, $r_6$, $r_7$ and $r_8$ are provided as shown in the drawing in order to adjust the base current of the transistors $Tr_1$, $Tr_1'$, $Tr_2$, and $Tr_2'$.

The primary winding $10_1$ of the transformer 10 is connected to the transistor 12, and the primary winding $11_1$ of the transformer 11 is connected to the transistor 12'. The pair of input pulses are applied to the bases of the transistors 12 and 12' so that those transistors are turned ON alternately. That is to say, when the transistor 12 is in ON state, the other transistor 12' is in OFF state, and when the transistor 12 is in OFF state, the other transistor 12' is in ON state. When the transistor 12 is turned ON by the input pulse, an electric current flows in the primary winding $10_1$ of the transformer 10 from the direct current power source $+V$ to the ground through that transistor, then, a voltage is induced on the secondary windings $10_2$ and $10_2'$, and those secondary voltages conduct the transistors $Tr_1$ and $Tr_2$ at the same time. Therefore, the electric current flows from the positive electrode P of the power source 2 through the transistor $Tr_1$, the primary winding $1_1$ of the transformer 1, the transistor $Tr_2$ to the negative electrode N of the power source 2. In this case, the direction of the current in the primary winding $1_1$ of the transformer 1 is shown by the arrow (a).

On the other hand, when the transistor 12 is in OFF state, and the transistor 12' is in ON state, the switching transistors $Tr_1'$ and $Tr_2'$ are conducted, and so, the electric current flows from the positive electrode P of the power source 2, through the transistor $Tr_2'$, the primary winding $1_1$ of the transformer 1 and the transistor $Tr_1'$ to the negative electrode N of the power source 2. The direction of the current in the primary winding $1_1$ in this case is shown by the arrow (b).

Therefore, by conducting the transistors 12 and 12', alternately, the alternate current either in the direction (a) or in the direction (b) flows in the primary winding $1_1$ of the transformer 1, and then, the secondary voltage is induced on the secondary winding $1_2$ of the transformer 1, and said secondary voltage is applied to the load 4 through the rectifier/smoother circuit C which has a pair of rectify diodes $D_1$ and $D_2$, an inductance L and a capacitance $C_1$.

The capacitance $C_2$ connected between the center point of the primary winding $1_1$ of the transformer 1 and the negative terminal N of the power source 2 fixes substantially the potential of the center point of the primary winding within the range of the predetermined potential relating to the potential of the power source 2. Although that capacitor $C_2$ is charged and discharged a little according to the ON status and the OFF status of the transistors, the change of the voltage across the electrodes of the capacitor $C_2$ due to the charge and the discharge is small, thus, the voltage between the center point of the primary winding $1_1$ and the negative terminal N of the power source 2, or the voltage across the capacitor $C_2$, is substantially constant.

Accordingly, when all the four transistors are in OFF status in a short time and the primary winding is completely disconnected from the power source 2, the potential of the primary winding is determined by the voltage across the capacitor $C_2$. Therefore, the flyback voltage induced on the primary winding $1_1$ is within the range of the output voltage of the power source 2, and said flyback voltage does not exceed the power source voltage. Accordingly, said flyback voltage does not leak to the lines of the power source through the diodes $d_1$ through $d_4$.

When one of the driving transistors 12 becomes to OFF state, a flyback voltage is induced on the secondary windings $10_2$ and $20_2'$ of the transformer 10, and that flyback voltage absorbs the base carriers in the pair of switching transistors $Tr_1$ and $Tr_2$, thus, the hole storage time of those transistors $Tr_1$ and $Tr_2$ is shortened, and those transistors $Tr_1$ and $Tr_2$ become to the OFF status promptly, then, the current flowing the primary winding of the transformer 1 stops promptly.

Since the secondary windings $10_2$ and $10_2'$ are commonly coupled with the primary winding $10_1$ magnetically, the energy of the flyback voltage induced in the primary winding $10_1$ is equal to the energy of the flyback voltage consumed in the secondary windings $10_2$ and $10_2'$. However, the power consumption in one ($10_2$) of the secondary windings is not always equal to that in the other ($10_2'$) of the secondary windings. That is to say, when the base carrier stored in the first switching transistor $Tr_1$ is different from that stored in the second switching transistor $Tr_2$, the more energy is consumed in the switching transistor which stores the more base carrier. Accordingly, when the storage characteristics of the first switching transistor is far different from that of the second switching transistor, for instance, when the hole storage time of the second switching transistor $Tr_2$ is far longer than that of the first switching transistor $Tr_1$, the second switching transistor $Tr_2$ which has the more base carrier releases the more base carrier. Thus, the hole storage time of the second switching transistor $Tr_2$ is much reduced, and the hole storage time of the first switching transistor $Tr_1$ is reduced a little. Therefore, the time for turning to the OFF state in the first switching transistor $Tr_1$ becomes close to that of the second switching transistor, and thus, two transistors become to the OFF status almost at the same time.

In order to improve the effect of the consumption of the base carrier thus described, the diodes $d_{11}$, $d_{13}$, $d_{15}$, $d_{17}$ connected parallel to the resistors $r_1$, $r_3$, $r_5$ and $r_7$, respectively, so that the anode of each diode is connected to the transformer and the cathode of each diode is connected to the base of the transistor as shown with the dotted line in FIG. 3A is effective. With those diodes, the base carrier flows from the base of each transistor through the diode to the secondary winding of the transformer 10 or 11.

Figure 3B:
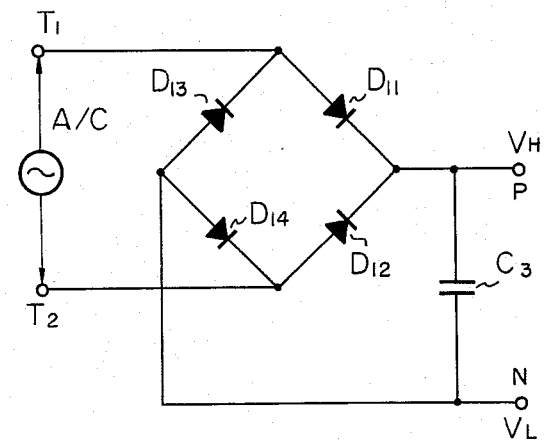
FIG. 3B is the alternative of the battery 2 in FIG. 3A.

FIG. 3B shows the circuit diagram of the rectify circuit which can be utilized as an alternative of the battery or the power supply 2 in FIG. 3A. In FIG. 3B, four diodes $D_{11}$ through $D_{14}$ compose a bridge circuit, and an alternate input voltage which is a commercial power supply is applied to the first pair of the arms of that bridge circuit, and the DC output is derived from the other pair of arms of the bridge circuit. The capacitor $C_3$ is provided between the output terminals P and N for the smoothing purpose. Of course, the power supply as shown in FIG. 3B can replace the battery 2 in FIG. 2A and FIG. 4.

In a preferable embodiment of the present invention, the capacitance of the capacitor $C_2$ in FIG. 3A is 0.047 $\mu F$, the input voltage of the power supply (A/C) in FIG. 3B is 200 volts, and the withstand voltage of the switching transistors $Tr_1$, $Tr_2$, $Tr_1'$ and $Tr_2'$ is 400 volts. The capacitance $C_2$ can be constant irrespective of the operating frequency of the circuit and/or the operating input or output voltage.

Figure 4:
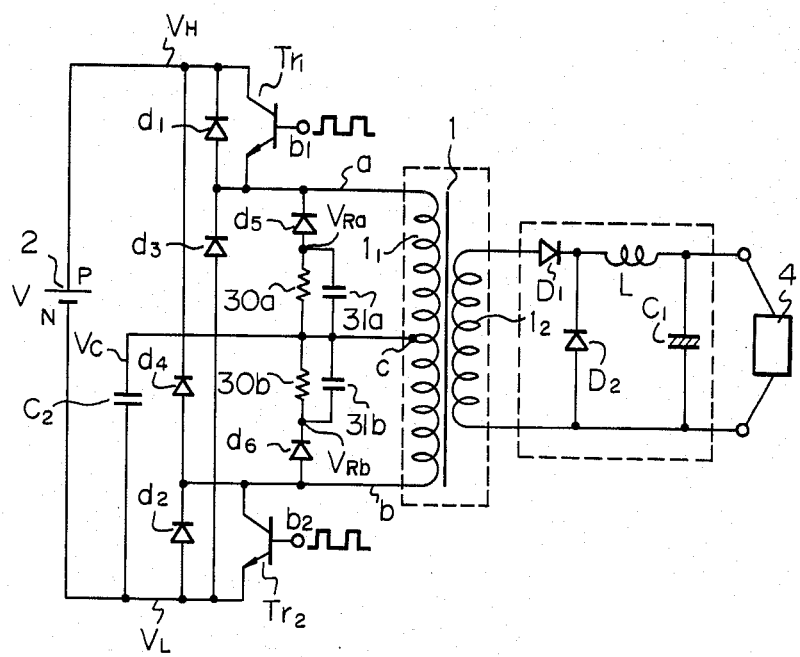
FIG. 4 is the circuit diagram of the other embodiment of the present DC-DC converter.

FIG. 4 is another embodiment according to the present invention. In FIG. 4, the reference numeral 1 is a transformer having the primary winding $1_1$ and the secondary winding $1_2$, $Tr_1$ and $Tr_2$ are switching transistors, 2 is a battery or the DC power supply, $D_1$, $D_2$, $d_1$, $d_2$, $d_3$, $d_4$, $d_5$ and $D_6$ are diodes, $C_1$, $C_2$, $31a$ and $31b$ are capacitors. Also, $30a$ and $30b$ are resistors, L is an inductance, and 4 is a load.

One end (a) of the primary winding $1_1$ of the transformer 1 is connected to the positive terminal P of the power source 2 through the parallel circuit of the collector-emitter path of the transistor $Tr_1$ and the diode $d_1$ which prevents the flyback voltage, and said end (a) is also connected to the negative terminal N of the power source 2 through the diode $d_4$ which is for clamping the voltage. Similarly, the other end (b) of the primary winding $1_1$ of the transformer 1 is connected to the negative terminal N of the power source 2 through the parallel circuit of the transistor $Tr_2$ and the diode $d_2$, and is also connected to the positive terminal P of the power source 2 through the clamping diode $d_4$. The center point (c) of the primary winding $1_1$ is connected to the negative terminal N of the power source 2 through the capacitor $C_2$. Also, the series circuit of the diode $d_5$ and the parallel connected resistor $30a$ and capacitor $31a$ is connected between the one end (a) and the center point (c) of the primary winding $1_1$. Similarly, the diode $d_6$ and the parallel circuit of the resistor $30b$ and the capacitor $31b$ are connected between the other end (b) and the center point (c) of the primary winding $1_1$. The secondary winding $1_2$ of the transformer 1 is connected to the load 4 through the rectifiers $D_1$ and $D_2$, and the smoothing circuit having the inductance L and the capacitance $C_1$.

By applying the control pulse signals $(b_1)$ and $(b_2)$ to the bases of the transistors $Tr_1$ and $Tr_2$, so that those transistors turn ON or turn OFF simultaneously, the current flowing in the primary winding $1_1$ is interrupted by said control pulse signals, and an alternate voltage is induced on the secondary winding $1_2$ of the transformer 1. That alternate voltage is rectified by the diodes $D_1$ and $D_2$, and is applied to the load 4 through the smoothing circuit.

The capacitor $C_2$ connected between the center point (c) and the negative terminal N of the power source 2 fixes substantially constant the potential of the center point (c) to the potential $V_c$, which is in the predetermined range relating to the source voltage V, as described in accordance with $C_2$ in FIG. 3A.

Figure 5:
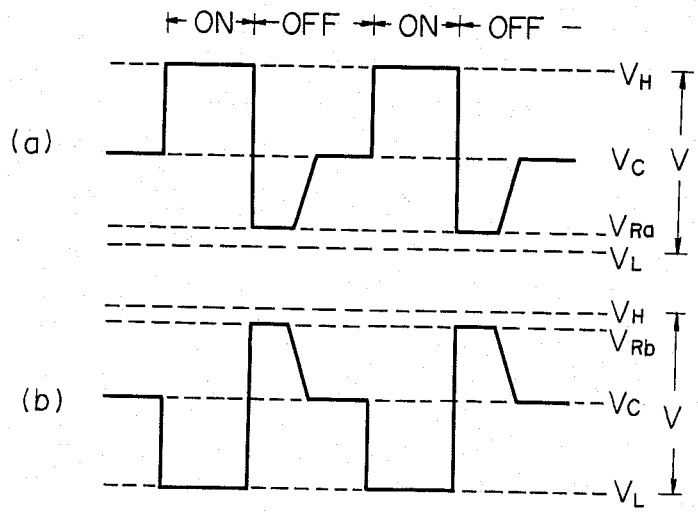
FIG. 5 shows the operational waveforms of the DC-DC converter in FIG. 4.

Accordingly, the potentials at the point (a) and the point (b) are shown in FIG. 5. When the two transistors $Tr_1$ and $Tr_2$ are turned ON, the potential at the point (a) of the primary winding $1_1$ raises up to $V_H$, and the potential at the other point (b) is lowered to the potential $V_L$. Next, when the switching transistors $Tr_1$ and $Tr_2$ are turned OFF, the potential at the point (a) becomes to the potential $V_{Ra}$ due to the presence of the parallel circuit of the resistance $30a$ and the capacitor $31a$, but that potential at the point (a) does not become to $V_L$ in spite of the presence of the diode $d_3$. As the capacitor $31a$ discharges, the potential at the point (a) raises slowly, and reaches the potential $V_c$ which is the potential at the center point (c). Similarly, the potential at the point (b) does not raise to $V_H$ in spite of the presence of the diode $d_4$, but is clamped to the level $V_{Rb}$, and then, reaches to the level $V_c$.

In the above explanation, $V_H$ is the potential of the positive terminal P of the power supply 2, $V_L$ is the potential of the negative terminal of the power supply 2, $V_{Ra}$ is the potential at the junction point of the diode $d_5$ and the parallel circuit including the capacitor $31a$ and the resistor $31a$, $V_{Rb}$ is the potential at the junction point of the diode $d_6$ and the parallel circuit including the capacitor $31b$ and the resistor $30b$, and $V_c$ is the potential at the center point of the primary winding $1_1$ as shown in FIG. 4.

As mentioned above, the potential of the center point is fixed in the predetermined range, and the potential at the ends of the primary winding is also limited to the allowable potential range. Therefore, the switching transistors can have the margin of the withstand voltage, and the noise leaked to the power supply line is reduced. Therefore, the excellent DC-DC converter with high reliability can be obtained.

Some modifications and alternatives are of course possible to those skilled in the art. For instance, the driving circuit or the means for controlling the status of the transistors in the embodiments of FIG. 2A and FIG. 4 can be a transformer similar to the transformer 10 or 11 in FIG. 3A. In the embodiment of FIG. 2A and FIG. 4, since only a single pair of switching transistors are employed, a single driving transformer is enough, although the embodiment in FIG. 3A employs two pairs of driving transformers 10 and 11.

Further, one end of the capacitor $C_2$ in FIG. 2A, FIG. 3A and FIG. 4 can be connected to any fixed potential like the ground, although said end is connected to the negative terminal N of the power source 2 in the embodiments.

From the foregoing it will now be apparent that a new and improved DC-DC converter has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A DC-DC converter for converting a primary DC voltage to a secondary DC voltage comprising a transformer with a primary winding and a secondary winding each would on a ferromagnetic core, a primary DC voltage power source, switching transistors connected between said DC voltage power source and the ends of the primary winding of said transformer, means for controlling the status of said transistors so that the current in the primary winding from the DC voltage power source is switched, a rectify/smoothing circuit connected between the output of the secondary winding of the transformer and a load, and said primary winding of the transformer having a center tap which is connected to a fixed predetermined potential through a capacitor.

2. A DC-DC converter according to claim 1, wherein there are two pairs of switching transistors ($Tr_1$, $Tr_2$) and ($Tr_1'$, $Tr_2'$), first pair of transistors ($Tr_1$, $Tr_2$) are turned ON or OFF simultaneously, the second pair of transistors ($Tr_1'$, $Tr_2'$) are also turned ON or OFF simultaneously so that when the first pair of transistors are in ON status the second pair of transistors are in OFF status, and when the first pair of transistors are in OFF status the second pair of transistors are in ON status in order to provide an alternate current in said primary winding.

3. A DC-DC converter according to claim 2, wherein said means for controlling the status of the transistors has the first and the second transformers each having a single primary winding and a pair of secondary windings, the secondary windings of the first transformer are connected to the bases of the first pair of transistors ($Tr_1$, $Tr_2$) and the secondary windings of the second transformer are connected to the bases of the second pair of transistors ($Tr_1'$, $Tr_2'$), and the primary windings of said transformers are supplied a pulse signal alternately.

4. A DC-DC converter according to claim 1, wherein there are two transistors ($Tr_1$, $Tr_2$) which are turned ON or OFF simultaneously so that the intermittent current in the predetermined direction flows in the primary winding of the transformer.

5. A DC-DC converter according to claim 1, wherein a diode is connected between the collector and the emitter of each transistor for absorbing the flyback voltage generated in the primary winding of the transformer during when the related transistor is turned to OFF.

6. A DC-DC converter according to claim 4, wherein said means for controlling the status of the transistors has the transformer having a single primary winding and a pair of secondary windings, the secondary windings are connected to the bases of the pair of transistors ($Tr_1$, $Tr_2$), and the primary winding of the transformer is supplied a pulse signal.

* * * * *

UNITED STATES PATENT AND TRADEMARK OFFICE
CERTIFICATE OF CORRECTION

PATENT NO. : 4,280,174

DATED : July 21, 1981

INVENTOR(S) : Eijuro Sonda

It is certified that error appears in the above—identified patent and that said Letters Patent is hereby corrected as shown below:

Column 1, line 19, "$D_1$" should read -- $C_1$ --.
Column 4, line 24, "$TR_2$" first occurrence, should read -- $TR_1'$ --.
Column 5, line 52, "$20_2$" should read -- $10_2'$ --.
Column 7, line 48, "31a" should read -- 30a --.

Signed and Sealed this

Twenty-fourth Day of November 1981

[SEAL]

Attest:

Attesting Officer

GERALD J. MOSSINGHOFF

Commissioner of Patents and Trademarks